US010053226B2

(12) United States Patent
Leland

(10) Patent No.: US 10,053,226 B2
(45) Date of Patent: Aug. 21, 2018

(54) AIRCRAFT-VISION SYSTEMS AND METHODS FOR MAINTAINING SITUATIONAL AWARENESS AND SPATIAL ORIENTATION

(71) Applicant: Environmental Tectonics Corporation, Southampton, PA (US)

(72) Inventor: Richard A. Leland, Sellersville, PA (US)

(73) Assignee: Environmental Tectonics Corp., Southampton, PA (US)

(*) Notice: Subject to any disclaimer, the term of this patent is extended or adjusted under 35 U.S.C. 154(b) by 82 days.

(21) Appl. No.: 14/981,718

(22) Filed: Dec. 28, 2015

(65) Prior Publication Data
US 2016/0272340 A1 Sep. 22, 2016

Related U.S. Application Data

(60) Provisional application No. 62/096,763, filed on Dec. 24, 2014.

(51) Int. Cl.
*B64D 43/02* (2006.01)
*G02B 27/01* (2006.01)
*G02B 5/32* (2006.01)

(52) U.S. Cl.
CPC ......... *B64D 43/02* (2013.01); *G02B 27/0103* (2013.01)

(58) Field of Classification Search
CPC ........ G02B 27/0103; G02B 2027/0105; G02B 2027/0109; G02G 27/0105; G01C 15/14; G01C 21/365; G08G 5/0021
See application file for complete search history.

(56) References Cited

U.S. PATENT DOCUMENTS

| | | | |
|---|---|---|---|
| 5,072,218 A * | 12/1991 | Spero | G02B 27/017 340/980 |
| 5,486,821 A * | 1/1996 | Stevens | G01C 23/00 340/970 |
| 5,982,536 A * | 11/1999 | Swan | F41H 5/266 345/1.3 |
| 2003/0127557 A1 * | 7/2003 | Anderson | G01C 23/00 244/1 R |
| 2004/0100670 A1 * | 5/2004 | Eberl | G02B 5/32 359/15 |
| 2005/0007261 A1 * | 1/2005 | Berson | G01C 23/00 340/945 |
| 2006/0080004 A1 * | 4/2006 | Cheok | G01C 15/14 701/1 |
| 2011/0199661 A1 * | 8/2011 | Kreitmair-Steck | B64D 43/00 359/13 |

(Continued)

FOREIGN PATENT DOCUMENTS

WO WO 2015035451 A1 * 3/2015 ............. G01C 23/00

*Primary Examiner* — Dale Moyer
(74) *Attorney, Agent, or Firm* — Axenfeld Law Group, LLC; Robert R. Axenfeld

(57) ABSTRACT

Aircraft-vision systems and methods for maintaining situational awareness and spatial orientation are described. In one aspect, a holographic image with visual cues is projected into a peripheral area—from the pilot's perspective—of an aircraft cockpit, such that visual cues stimulate the pilot's peripheral vision. These visual cues help the pilot to maintain spatial orientation in visually deficient flight conditions without increasing pilot workload.

10 Claims, 5 Drawing Sheets

(56) References Cited

U.S. PATENT DOCUMENTS

| | | | |
|---|---|---|---|
| 2014/0175221 A1* | 6/2014 | Zaneboni | B64D 41/00 244/118.6 |
| 2014/0180508 A1* | 6/2014 | Zaneboni | B64D 45/00 701/14 |
| 2015/0241221 A1* | 8/2015 | Colby | G01C 23/00 701/431 |

* cited by examiner

AIRCRAFT-VISION SYSTEMS AND METHODS FOR MAINTAINING SITUATIONAL AWARENESS AND SPATIAL ORIENTATION

CROSS-REFERENCE TO RELATED APPLICATIONS

This application claims the benefit of U.S. Provisional Application Ser. No. 62/096,763 filed Dec. 24, 2014, the entirety of which is hereby incorporated by reference herein.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights rights whatsoever.

BACKGROUND

Pilots are deprived of important visual cues during night, or Instrument Meteorological Condition ("IMC") flying. In some cases pilots are presented with false-ambient-visual cues. These problems often cause the pilot to misperceive the position, and/or motion of the aircraft with the plane of the earth's surface. This phenomenon is known as spatial disorientation, and can lead to costly or catastrophic accidents.

In other words, when a pilot flies at night, during IMC flight, when air-to-air refueling, and/or other low visibility situations, he is deprived of important visual cues, which can cause disorientation, and problems judging closure. These are dangerous problems, and can cause a catastrophic mishap; especially for an inexperienced pilot.

Disorientation and difficult judging closure are further exacerbated when pilots fly with Night Vision Goggles ("NVGs"). During flight using NVGs, significant portions of the flight are usually conducted using unaided night vision. However, when pilots transition between NVG flight, and unaided-night-vision flight, problems occur because the pilot is not dark adapted. This phenomenon blocks most of the pilot's ability to perceive low-light cues, many of which are critical to maintaining situational awareness, and spatial orientation of the aircraft.

For military pilots flying close formation, losing sight of the lead aircraft can be a very disorienting situation for the wingman; especially when transitioning from visual-orientational cues from the lead aircraft to instrument flight (referred to as "Going Lost Wingman"). Since instrument flight requires conscious information processing, pilots can become overwhelmed when experiencing a Going Lost Wingman situation.

Many attempts have been made to solve the foregoing problems by providing pilots with attitude-orientation cues. For example, Artificial Horizons (attitude Indicators), and Head-Up Displays are commonly used in aircraft today to provide attitude-orientation cues. But these instrument displays (i.e., attitude indicates) often fail to improve the pilot's situational awareness, and spatial orientation during night flying, IMC flying, or when transitioning between NVG-aided flight, and unaided-night-vision flight.

In addition, during a high-workload situation, pilots often become overwhelmed, and fail to notice critical-orientation information being disseminated from these visual instruments.

Thus, heretofore there are no adequate solutions to improve a pilot's situational awareness and spatial orientation; especially when a pilot is involved in high-workload events, such as during IMC flying (during attitude cross checking), an upset condition, or other high-stress or high-demand-flight conditions that require the immediate attention of a pilot.

Consequently, spatial disorientation and loss of situational awareness by a pilot are significant factors in many airplane accidents. The definition of spatial disorientation is the failure to correctly orient oneself with respect to the Earth's surface due to misinterpretation of the aircraft's position and/or motion. All pilots are susceptible to sensory illusions. Pilots who perceive a conflict between bodily senses, and an aircraft's flight instruments, and can't resolve the conflict are spatially disoriented.

Allowed to continue, a spatial-disorientation episode can lead to an aircraft mishap involving Loss of Control Inflight (LOC-I), or Controlled Flight Into Terrain (CFIT)—the two leading causes of commercial aviation fatalities. Attention to flight instruments, and a good cross-check are the keys to remaining spatially oriented, but these actions place an additional workload on pilot's processing.

To reduce the workload on a pilot, today's modern aircraft are often equipped with flight directors, autopilots, autothrottles, flight-management systems, glass cockpits (i.e., a cockpit that features digital flight instruments displays), and ground-collision-avoidance systems. When used properly, these automated systems contribute to flight safety, and reduce pilot workload. But these systems fail to prevent a pilot from becoming spatially disoriented, or prevent an aircraft mishap. In other words, pilots often become complacent with or improperly use these automated system, and consequently, still become spatially disoriented.

For instance, data from the U.S. National Transportation Safety Board shows that between 1993 and 2002, there were 2,131 fatalities in loss of control accidents, and that some of these fatalities were attributable to airplane upsets. See Docket No. SA-531 Exhibit No. 14-M, National Transportation Safety Board Washington, D.C. Flight Safety Digest, July.

A more recent industry source reports that there were 17 LOC-I accidents, and 16 CFIT accidents resulting a total of 2,509 fatalities. See "Statistical Summary of Commercial Jet Airplane Accidents Worldwide Operations|1959-2014" (www.boeing.com/news/techissues/pdf/statsum.pdf, August, 2015).

It is believed that spatial disorientation accounts for nearly a third of all mishaps, with a fatality rate of nearly 100% in military aviation.

Statistics also show that before the advent the present invention, between five percent and ten percent of all general aviation accidents are attributed to spatial disorientation, with 90% of these accidents being fatal.

Still further, a recent 10 year review, reveals that at least 11% of serious rotor wing flight accidents—i.e., resulting in at least $50,000 in aircraft damage, or at least one day of work absence (AR 385)—were linked to spatial disorientation.

These accident and fatality statistics suggest that before the advent of present invention that: (1) the problems of Spatial Disorientation and Loss of Situational Awareness persists; and (2) a solution to help pilots cope with these problems is not being adequately solved by the aforementioned automated-flight systems used in today's modern aircraft.

In sum, heretofore, there were no adequate solutions to improve a pilot's situational awareness and spatial orientation; especially when a pilot is involved in high-workload events, such during IMC flying (during attitude cross checking), night or stormy flight, NGG flight, an upset condition, or other high-stress or high-demand-flight conditions that require the immediate attention of a pilot.

SUMMARY

As noted in the Background above, many attempts have been made to solve the problems of inflight Spatial Disorientation and Loss of Situational Awareness by providing pilots with attitude-orientation cues. For example, Artificial Horizons (attitude Indicators) and Head-Up Displays are commonly used in aircraft today to provide attitude-orientation cues.

However, these systems require the pilot to perceive orientational information via his or her "focal vision," which is processed by the conscious brain, which is a logical, serial, and slow-information processor.

Consequently, in a high-workload situation, the conscious brain can become overwhelmed, and critical-orientation information may go unprocessed. Thus, leading to spatial disorientation and/or Loss of Situational Awareness. And attitude indicators often fail to improve the pilot's situational awareness and spatial orientation during night flight, IMC flying, and/or when transitioning between NVG-aided flight, and unaided-night-vision flight.

So, before the advent of the present invention there were no adequate solutions, to improve a pilot's situational awareness and spatial orientation during the aforementioned flight conditions; especially when a pilot is involved in high-workload events that require his immediate, and utmost attention.

To solve these problems, this document introduces the broad innovative concept of generating peripheral-visual-orientational cueing in an aircraft cockpit. Generating critical peripheral-visual-orientational cues—rather than, or in addition to focal-visual cues—in the cockpit of an aircraft takes advantage of a pilot's "preconscious processing." Preconscious processing seems to operate independently of the conscious brain, which is where focal vision is processed.

Put differently, the human brain cognitively processes peripheral vision in a preconscious manner, which allows for more rapid, simultaneous, and multiple-information-processing capabilities than focal-vision processing.

The innovative example systems and methods described in this document, when implemented in the cockpit of modern aircraft, will allow pilots to better maintain inflight-spatial orientation, and situational awareness. As a result, the example systems and methods described in this document when implemented, will help reduce aircraft mishaps associated with inflight Spatial Disorientation and Loss of Situational Awareness. Most importantly, the concepts associated with these example systems and methods will ultimately save lives.

This summary is provided to introduce a selection of concepts in a simplified form that are further described below. This summary is not necessarily intended to identify key features or essential features of the claimed subject matter, nor is it necessarily intended to be used as an aid in determining the scope of the claimed subject matter.

The foregoing outlines examples of this disclosure so that those skilled in the relevant art may better understand the detailed description that follows. Additional embodiments and details will be described hereinafter. Those skilled in the relevant art should appreciate that they can readily use any of these disclosed embodiments as a basis for designing or modifying other structures or functions for carrying out the invention, without departing from the spirit and scope of the invention.

Reference herein to "one embodiment", "an embodiment", "an implementation," "an example," "an aspect," or similar formulations herein, means that a particular feature, structure, operation, or characteristic described in connection with the embodiment, is included in at least one embodiment of the present invention. Thus, different appearances of such phrases or formulations herein do not necessarily refer to the same embodiment. Furthermore, various particular features, structures, operations, or characteristics may be combined in any suitable manner in one or more embodiments.

BRIEF DESCRIPTION OF THE DRAWINGS

The detailed description is described with reference to the accompanying figures. In the figures, the left-most digit(s) of a reference number identifies the figure in which the reference number first appears. The figures are not necessarily drawn to scale.

DETAILED DESCRIPTION 1.0 Introduction

Figure 1:
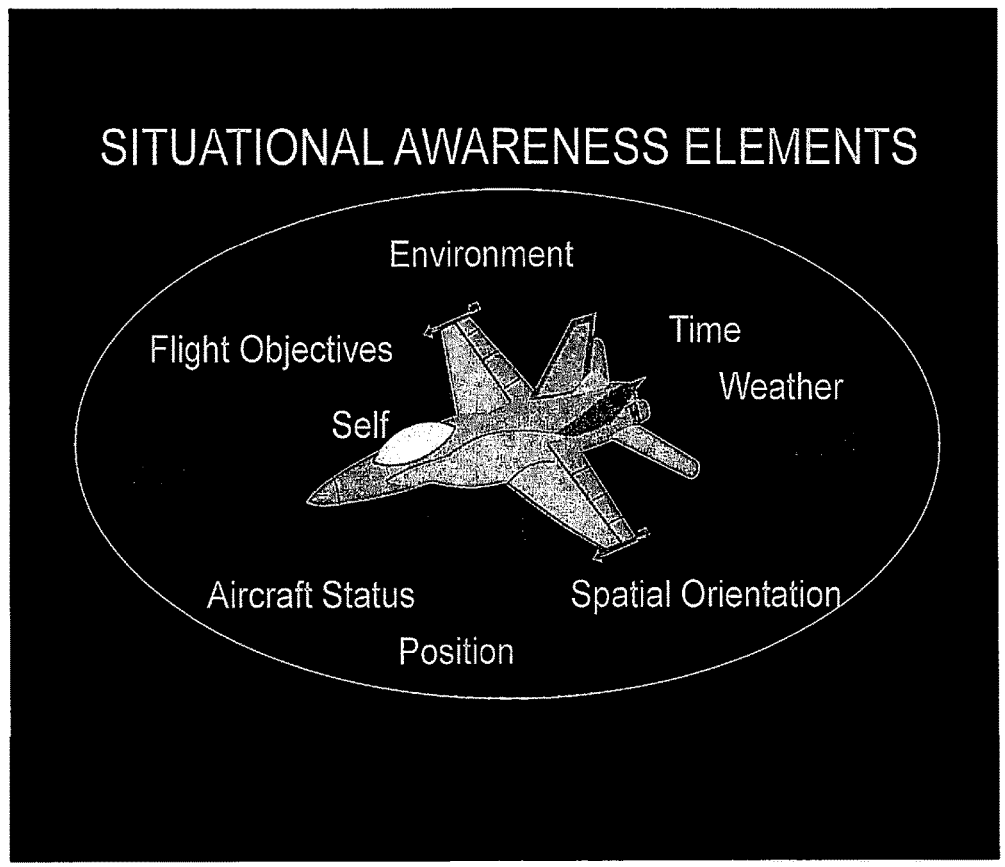
FIG. 1 is logical diagram listing multiple situational awareness elements.

Human physiology, human-stimulus-reception systems, and human-information-processing systems quickly become inadequate in the fast paced, dynamic-flight environment. Spatial Disorientation and Loss of Situational Awareness are persistent problems caused by these inadequacies and consequently, there currently is no "cure" that can completely eradicate these problems. However, training that focuses on awareness, knowledge and the "hands-on" management of Spatial Disorientation can greatly minimize both their occurrence and their consequences. Most Spatial Disorientation mishaps are preventable.

Spatial Disorientation

Several definitions of Spatial Disorientation ("SD") exist. From a research standpoint, SD is defined as, an erroneous sense of position and motion relative to the plane of the earth's surface. See Gillingham Kent K and. Previc Fred H., "Spatial Orientation in Flight", Armstrong Laboratory, Brooks Air Force Base, Texas, 1993. An operator-oriented definition is, an erroneous sense of any flight parameter normally displayed on the aircraft performance instruments.

SD pervades military, commercial, and general aviation, and the consequences are costly both in terms of dollars and human life. During a 1990 address to a NASA sponsored workshop on SD, Dr. Kent Gillingham conservatively estimated that in the U.S., SD was responsible for wasting "hundreds of millions of dollars worth of Defense resources every year." If commercial, civil, and private aviation mishaps due to SD are also considered, that number becomes even higher.

Because SD results from inherent inadequacies of the human visual, vestibular, somatosensory, and (to a degree) aural systems in the flight environment, there is no simple "cure" for SD.

However, emerging technologies and meaningful academic instruction followed by interactive training can enhance a pilot's ability to recognize the situations conducive to SD and thereby minimize its occurrence. If an SD episode does occur, the properly trained pilot can more readily convert an unrecognized (Type I) episode to a recognized (Type II) episode. This is important because the great majority of SD mishaps are the result of Type I episodes, and early recognition allows prevention or recovery before a situation has deteriorated to a point where successful recovery is no longer possible.

A third, less common type of SD is known as Type III, or incapacitating SD. In this case, the pilot recognizes that he/she is disoriented, but the illusion is so strong that the pilot is unable to effectively control the aircraft.

Situational Awareness

Situational Awareness (SA) can be defined as a pilot's constant awareness and accurate perception of all factors and conditions which affect the aircraft, the pilot, and performance of the flight in his/her dynamic flight environment—a constant, accurate awareness of time, place and circumstance.

Accordingly, SA comprises the sum of all the information and knowledge that the pilot must possess to safely and effectively conduct his/her flight. The product of accurate SA is an on-going appreciation of what has happened recently (the past), what is currently happening (the present), and the capability to predict what most likely will occur next (the future). This awareness allows the pilot to manage his/her situation and execute appropriate tasks proactively rather than reactively, thereby reducing critical response time. Loss of SA is the leading cause of all human factor mishaps. Accordingly, the pilot's ability to constantly maintain SA is critical to maintaining flight safety.

Maintaining SA involves consciously attending to a great deal of information in a highly dynamic, fast paced environment. For instance, FIG. 1 is a diagram listing situational-awareness elements. Because the limits of the human conscious brain—is in reality a slow and serial processor—effective management of conscious attention is a key element to maintaining situational awareness.

Put differently, "Attention Management" is the continuous allocation and reallocation of conscious attention to elements in the dynamic flight environment as each element becomes significant. To better understand Attention Management, consider a performer who is juggling a number of balls. Since the conscious brain is a serial processor, the juggler can concentrate conscious attention on only one ball at a time. Therefore, he/she must constantly perceive what is happening to each ball and allocate a conscious attention to the one requiring corrective action. Anything that distracts or stagnates conscious attention in this dynamic situation will cause an "accident." The same statement can be said of pilots who suffer conscious attention stagnation or distraction in the flight environment.

Attention Management is key to maintaining SA. Several problems that disrupt attention management can occur inflight in fixed or rotary wing aircraft. These problems are often referred to as "pilot-attention anomalies" and are listed below in Table 1:

TABLE 1

| Attention Anomaly | Description |
| --- | --- |
| Temporal Distortion | The inability to accurately judge elapsed time |
| Channelized Attention | The focusing of attention on a limited number of environmental cues to the exclusion of other cues that may be of higher or more immediate priority. |
| Distraction | The interruption of the conscious attention management process due to the pilot attending to a cue that is not related to the task currently being executed. |
| Task Saturation | The inflight situation where the pilot simply has too much information that he/she must attend to at one time and therefore misses important cues. |
| Expectancy | The tendency for pilots to interpret what they actually perceive as what they expect (or want) to perceive. |
| Inattention | A situation that can occur if the pilot fails to devote the appropriate level of attention to the task he/she needs to accomplish. |
| Habituation | A situation that can occur when a pilot becomes so accustomed to a particular cue that he/she no longer attends to it (although it may well be a significant cue). |
| Negative Transfer | A condition where pilots may inappropriately execute a previously learned skill or action in response to a new and similar, but different situation. |

Each of the pilot-attention anomalies in Table 1 are discussed in more detail below:

Temporal (Time Sense) Distortion

"Temporal Distortion" is the inability to accurately judge elapsed time. Although neither the physiology nor the psychology of temporal distortion is well understood, it seems to be a normal human reaction to situations that involve high stress and/or high workloads. The most normal manifestation of temporal distortion is the perception that time has expanded or the passage of time has slowed.

People do reasonably well at judging elapsed time in hours, days or even weeks without the aid of clocks or calendars. However, they are woefully inaccurate when judging minutes and seconds (often misjudging by a factor of two or more). During a Temporal Distortion episode, this already existing inadequacy is even more pronounced.

Interestingly, people who have experienced high stress situations where temporal distortion has occurred can remember incredible amounts of information about the situation. For example, people who have survived a near death experience can often describe their experience in painstaking detail. This suggests that during a temporal distortion episode, people may actually process more information than they normally do (the good news), but their ability to accurately assess available time to act is compromised (the bad news).

Temporal Distortion is particularly troublesome for pilots because the pilot's already marginal ability to accurately estimate elapsed time in minutes and seconds is compromised even further during a temporal distortion episode. Unfortunately, seconds are the time frames in which pilots must make life critical decisions. Therefore, even though the pilot may actually process more information, he may choose a course of action that isn't appropriate for the time available.

Another problem caused by Temporal Distortion is the tendency for the pilot's instrument crosscheck to slow or stagnate. This often occurs without the pilot realizing that his performance is being compromised.

Temporal Distortion is likely to be present during any high stress and/or high demand situation where other attention anomalies may also be present.

Channelized Attention

"Channelized Attention" is the focusing of attention on a limited number of environmental cues to the exclusion of other cues that may be of higher or more immediate priority. It is the number one cause of loss of Situational Awareness mishaps. The frequency of Channelized Attention problems may be due to pilots' tendency and developed ability to focus their attention at the task at hand. (This trait is called Compartmentalization and was noted by Dr. Frank Dully in the 1980s.)

During Channelized Attention, the pilot allows his/her tendency toward compartmentalization to manifest itself pathologically. In this instance, only a small portion of the information needed to maintain Situational Awareness is being attended to and consequently, the pilot may not perceive other, critical information. Consequently, the pilot may allow a developing-hazardous situation to deteriorate unnoticed until successful recovery or resolution is no longer possible.

Several factors may contribute to Channelized Attention. These include: excessive motivation, lack of knowledge, emergency or contingency situations, and Temporal Distortion.

Excessive motivation may occur if the pilot intently focuses on limited cues in order to execute a specific task as precisely as possible, thereby missing important cues. An example of this may be a pilot who inadvertently flies below the minimum descent altitude (MDA) on an instrument localizer approach because he is channelized on precise localizer course control. In this case, the pilot focuses all of his attention on the Course Displacement Indicator (CDI) and the heading indicator, but excludes the altimeter.

Lack of knowledge can contribute to Channelized Attention because if the pilot does not know what information is situationally, important, he may unknowingly concentrate their attention on inappropriate aspects of their situation.

Emergency or contingency situations tend to be conscious attention "grabbers". In this case, a novel and unexpected situation is presented to the pilot that requires immediate conscious attention. The pilot's tendency in this situation may be to concentrate his conscious attention on the contingency while ignoring other important cues.

Finally, as previously noted, Temporal Distortion is present during most if not all high stress and/or high demand situations. Consequently, the pilot may believe that he has more time to focus his attention on a specific cue, because of an erroneous perception of time expansion.

Distraction

"Distraction" is the interruption of the conscious attention management process due to the pilot attending to a cue that is not related to the task currently being executed. These non-related cues can be classified into two categories: internal distractions and external distractions.

External distractions may consist of unexpected noises, vibration, untimely or inappropriate radio and intercom calls, and warning horns and/or lights that activate both at appropriate and inappropriate times. It is important to understand that more dynamic the flight conditions are the greater effect these distractions may have. This is because reaction time becomes much more critical during very dynamic flight conditions.

For example, a momentary distraction that occurs when the aircraft is in a descent close to the ground may have disastrous consequences whereas the same level of distraction occurring when the aircraft is at altitude, and in straight and level flight may not have any noticeable consequence.

On the other hand, internal distractions usually involve personal problems that the pilot is experiencing, but is not dealing with effectively. Sources of these types of problems may include family problems, social problems, financial problems, or career problems; just to name a few. If the pilot is no longer able to effectively deal with one or more of these problems, he may dwell on them during flight. These problems then become conscious attention "distracters," preventing the pilot from consciously attending to the cues that are germane to his flight situation.

Task Saturation

"Task Saturation" occurs when the pilot simply has too much information that he/she must attend to at one time, and therefore misses important cues. In this case, the pilot's conscious brain has the capacity to process a number of specific cues, but is overwhelmed by trying to process all of the cues in his environment. (Many times pilots will describe this feeling as "being behind the aircraft".) If some of the cues that go unprocessed are situationally critical, then the pilot's SA will deteriorate.

Several factors can contribute to Task Saturation. These include: high demand tasks, lack of experience, lack of currency, emergency or contingency situations, spatial disorientation, and poor-aircraft-system design. High-demand tasks place additional loads on the pilots' conscious attention in the flight environment. In some cases, these tasks can combine with the routine tasks to overwhelm the pilot's conscious processing ability.

Lack of experience and lack of recent experience (currency) can cause task saturation, because in this instance, the pilot cannot execute leaned tasks the way he/she normally would. Normally once a task is learned, it is stored in long term memory in the preconscious brain.

Thereafter, if a situation is perceived where that task is appropriate, the conscious brain will "call up" that task routine from the preconscious. Once selected, the execution of that task becomes a preconscious function, thus freeing the conscious brain to attend to other relevant flight environment cues. It is important to note that preconscious task execution is only possible if the pilot has recent experience (currency) in executing that task. Otherwise, portions of the task may be forgotten and task execution, once again, becomes a conscious activity. This problem is called a lack of recent experience or lack of currency.

As previously discussed, emergency and contingency situations as well as spatial disorientation episodes are, by definition, unique. Therefore, each emergency or contingency will require allocation of conscious attention. Again, if these conscious attention demands in conjunction with the existing demands, loss of SA may occur.

Finally, aircraft design flaws and compromises can contribute to Task Saturation. Few if any aircraft are ergonomically perfect. Rather, ergonomics (human engineering) is a best compromise between aircraft performance and human needs. Consequently, switches may not be optimally placed, instrument displays may not be optimally laid out, and controls may not be optimally designed. These compromises seldom negatively affect performance when flying undemanding flight maneuvers in clear weather conditions. However, they may well cause task saturation when high demand maneuvers are being attempted in night or instrument conditions. Unfortunately, pilots seldom seem to consider these Task Saturation "traps" in the aircraft they fly until it is too late.

Expectancy

"Expectancy" is defined as interpreting what you ACTUALLY perceive as what you EXPECT (or want) to perceive. Studies of common aviator personality traits have noted that pilots tend to strongly endorse what they believed to be correct information, even in the face of conflicting information (alloplastic). This observation may help explain why expectancy can contribute to loss of SA. For example, a pilot looking at an attitude indicator expecting to see a left bank may misinterpret the right bank that is displayed and actually "see" a left bank.

Expectancy causes serious problems when it degrades communication accuracy between crewmembers or between pilots and controlling agencies. Again, if the pilot is motivated to perceive information in a certain way, he may have misinterpreted an otherwise accurate communication.

For example, expectancy may have contributed to the worst aviation disaster of the last century: the collision of two Boeing 747s on the runway at Teneriff (one of the Canary Islands). In this case, the pilot of a KLM B-747 was anxiously awaiting takeoff clearance and may have misinterpreted his flight clearance as takeoff clearance. Acting on this perception, the KLM aircraft took the runway and began takeoff roll without tower clearance and while a TWA B-747 was still on the runway. The two aircraft subsequently collided on the runway. Both aircraft were destroyed. Over 580 people perished in the crash.

Inattention

Inattention can occur if the pilot fails to devote the appropriate level of attention to the task he/she needs to accomplish. In this case, the pilot reverts to operating the aircraft on preconsciously executed, previously learned skills that are not being monitored by the conscious brain. In this case, the pilot may fair all right so long as the status quo is maintained.

However, if a perturbation or contingency is introduced into the situation, the pilot may not be able to react in a timely manner (i.e. reaction time is compromised). Many pilots and non-pilots alike have experienced "Inattention" in their cars while driving late at night after a full day on the road.

In this situation, the driver may note a mileage sign for the next town that is, for example, 30 miles away. After what seems like 10 minutes, the driver finds himself at the outskirts of that town, wondering how he drove 30 miles in 10 minutes. Of course, the answer was not good time management. Instead, the driver had experienced a prolonged period of inattention. Factors that contribute to Inattention can include fatigue, boredom, and lack of challenge. Pilots must realize that there are periods when they will encounter all of these factors during normal flying and be wary of Inattention during these times.

Habituation

"Habituation" occurs when a pilot becomes so accustomed to a particular cue that he no longer attends to it (although it may well be a significant cue). This is a particular problem with aircraft warning or alerting systems that activate both appropriately and inappropriately. In this case the pilot may develop a conditioned response to ignore or defeat the warning without evaluating it.

For example, a pilot may become conditioned to silencing a landing-gear-not-down warning horn that sounds each time the throttles are retarded past a certain point. Yet, the landing gear is not lowered because it sounds at altitude during stall practice. If the pilot subsequently forgets to lower the landing gear for landing from an actual approach and the warning horn comes on as the throttles are retarded, he may silence it out of habituation, and land gear up.

Again, several factors may predispose the pilot to Habituation. These include high-cockpit workloads, poor-aircraft design (e.g. warning or alerting systems that activate both appropriately and inappropriately), lack of experience, and lack or currency.

Negative Transfer

"Negative Transfer" is defined as inappropriately executing a previously learned skill or action in response to a new and similar, but different situation. In this case, the pilot may perceive the similarity of the situation, but fail to notice critical differences.

Consequently, the pilot may consciously select a previously learned skill, and preconsciously execute it even though it is not the correct response for the new situation. This can result in disastrous consequences. This is a particular problem for pilots who have just transitioned to a new aircraft, or are flying an aircraft that has undergone a major modification. In these situations, pilots should consider the human tendency toward negative transfer, but often don't recognize the problem, until it is too late.

Spatial Disorientation

Pilots of both fixed wing and rotary wing aircraft are deprived of important visual cues during night, or Instrument Meteorological Condition ("IMC") flying. In some cases pilots are presented with false-ambient-visual c cues. These problems often cause the pilot to misperceive the position, and/or motion of the aircraft with the plane of the earth's surface. This phenomenon is known as spatial disorientation, and can lead to costly or catastrophic accidents.

These problems are exacerbated when pilots fly with Night Vision Goggles ("NVGs"). During flight using NVGs, significant portions of the flight are usually conducted using unaided night vision. However, when pilots transition between NVG flight, and unaided-night-vision flight, problems occur because the pilot is not dark adapted. This phenomenon blocks most of the pilot's ability to perceive low-light cues, many of which are critical to maintaining situational awareness and spatial orientation of the aircraft.

For military pilots flying close formation, losing sight of the lead aircraft can be a very disorienting situation for the wingman since the pilot must transition from visual orientational cues from the lead aircraft to instrument flight (referred to as "Going Lost Wingman". Since instrument flight requires conscious information processing, pilots can become overwhelmed in a going lost wingman situation.

In a high-workload situation, the conscious brain can be overwhelmed and critical-orientation information may go unprocessed, a condition referred to as Loss of Situational Awareness. Thus, attitude indicators often fail to improve the pilot's situational awareness and spatial orientation during night and IMC flying, when going lost wingman, and when transitioning between NVG-aided flight, and unaided-night-vision flight.

Described below are systems and methods to improve a pilot's situational awareness and spatial orientation during these flight conditions; especially when a pilot is involved in high-workload events, such during IMC flying (during attitude cross checking), an upset condition, or other high-stress or high-demand-flight conditions that require the immediate attention of a pilot.

Many attempts have been made to solve the foregoing problems by providing pilots with attitude-orientation cues. For example, Artificial Horizons (attitude Indicators) and Head-Up Displays are commonly used in aircraft today to provide attitude-orientation cues. However, these systems require the pilot to perceive orientational cues via focal vision, which is processed by the Conscious brain (cerebral cortex). The conscious brain is a logical, serial, and relatively slow information processor. Accordingly Conscious workload must be carefully managed by the pilot.

As used in this paper, a "spatial-disorientation condition" generally means a misperception of the aircraft's position and/or motion with respect to the surface of the earth or to another aircraft. This condition results in a situation where the pilot of a fixed-wing aircraft or a rotary-wing aircraft is exposed to a number of illusions as shown in tables 2 and 3, respectively below:

TABLE 2

(Fixed-Wing-Aircraft Illusions)

| Illusion Title | Description |
| --- | --- |
| 1) Coriolis | Cross-coupled stimulation when angular motion of head is in any plane other than the plane of angular motion |
| 2) Somatogyral | False sensation of self-rotation caused by inability of semicircular canals to accurately register sustained motion |
| 3) Oculogyral | False perception of motion of another object (visual element of somatogyral illusion) |
| 4) Oculogravic | False perception of either a climb or descent resulting from linear acceleration or deceleration |
| 5) Graveyard Spin | False sensation of spin (angular acceleration) after recovery from prolonged spin in opposite direction |
| 6) Graveyard Spiral | False perception of angular acceleration in the opposite direction after recovery from a prolonged spiraling turn |
| 7) Nystagmus | Repetitive, compensatory reflex motion of eyes caused by sustained angular stimulation of semicircular canals |
| 8) Leans | False perception of bank (angular displacement) after recovery from a sub threshold roll in opposite direction |
| 9) Autokinesis | Apparent motion of stationary, dim light against dark background |
| 10) Runway Width | Creating false sensation of distance when object size is changed from familiar |
| 11) Black Hole | An illusion caused by total lack of environmental cues |
| 12) False Horizon (Day) | An illusion caused by mistaking cloud tops or bottoms, light reflection or smooth terrain features |
| 13) Dark Takeoff | Illustration of misperception of pitch angle during acceleration |
| 14) Downsloped Runway | Illustration of a false sense of low approach while approaching a downsloped runway |
| 15) Upsloped Runway | Illustration of a false sense of high approach while approaching an upsloped runway |
| 16) False Horizon (Night) | False perception of aircraft position caused by misinterpretation of ground lights or cloudbanks as actual horizon |
| 17) Somatogravic Illusion | Misperception of the aircraft pitch attitude following abrupt accelerations or decelerations when flying in degraded visual conditions |
| 18) Elevator | The false sensation of vertical movement caused by abrupt level-offs or encounters with turbulence |
| 19) Approach Over Sloping Terrain | Illustration of false sense of height when approaching over sloped terrain |
| 20) Vection | The false perception of self-movement caused by actual movement of another object in the ambient visual field |
| 21) Ground Lights and Stars | The misidentification of ground lights as stars when flying at night, which can cause pilots to have a false perception of wings level flight |
| 22) Fishing Boat-Formation Lights | Confusion of fishing boat lights and formation lights |

TABLE 3

(Rotary-Wing-Aircraft Illusions)

| Illusion Title | Description |
| --- | --- |
| 1) Distance and Depth Perception Errors | Errors in estimation of height or distance due to unfamiliar terrain features or a lack of terrain features. |
| 2) Flicker vertigo | A false sensation of movement caused by the shadows cast by turning rotor blades. |
| 3) Nystagmus | Repetitive, compensatory reflex eye movement caused by sustained angular acceleration of the semicircular canals. |
| 4) False Horizon | A false perception of the horizontal caused by sloping cloud decks, confusion of the actual horizon at night or a blending of an overcast sky and the surface if the water. |

TABLE 3-continued (Rotary-Wing-Aircraft Illusions)

| Illusion Title | Description |
|---|---|
| 5) Black Hole | Loss of accurate distance and depth perception cues caused by a near total lack of environmental cues during a night approach and landing. |
| 6) Leans | A false perception of bank which can occur after roll out from a turn which has been entered at a very slow rate or after roll out from a prolonged turn. |
| 7) Coriolis | An intense tumbling sensation caused by the stimulation of the semicircular canals in two or more axes due to multiple angular accelerations. |
| 8) Autokinesis | The false apparent movement of a dim, but stationary single point light against a featureless, dark background. |
| 9) Brownout/Whiteout | Loss of visual cues during hover due to dust or snow blown up by rotor downwash when transitioning to a low hover. |
| 10) Undetected Drift in Hover | Undetected changes in position when hovering over featureless terrain in degraded visual conditions. |

As used in this paper "situational awareness" generally means the perception of the elements in the environment within a volume of time, and space, and the comprehension of their meaning and the projection of their status in the near future.

As used in this paper "attention management" generally means the continuous allocation, and reallocation of conscious attention to elements in the dynamic flight environment as each element becomes significant.

The loss of situational awareness can be caused by a disruption in the conscious and preconscious processing of information due to any of the aforementioned attention anomalies.

2.0 Example Peripheral-Holographic Cueing

To solve the above problems, described herein are example systems and methods that provide peripheral-visual cues to a pilot. These peripheral-visual cues enhance spatial orientation and better allow a pilot to maintain situational awareness in an aircraft without increasing his processing workload.

While examples are described herein with reference to aircraft, such as fixed-wing or rotary aircraft, it should be appreciated by those skilled in the art after having the benefit of this disclosure, that the example implementations and innovative concepts can be configured for use in other vehicles, such as automobiles, construction equipment, trucks, hovercraft, ships, boats, submarines, spacecraft, or any other vehicle where it is possible to lose situational awareness.

In at least one aspect, a pilot's preconscious brain is stimulated with visually-significant orientational percept. The visual stimulation is compatible with both NVGs and unaided night vision. That is, the visual stimulation will not overpower a pilot's ability to perceive the NVGs, nor destroy the pilot's ability to adapt to the dark when not using NVGs or other visual aids.

In one aspect, a holographic image is generated in a cockpit of an aircraft to stimulate the peripheral vision of the pilot. Hence, the holographic image stimulates a pilot's preconscious brain.

In one aspect, a holographic image is generated along a peripheral portion—from the pilot's perspective—of the cockpit, such as to the left of right of the pilot.

Figure 2:
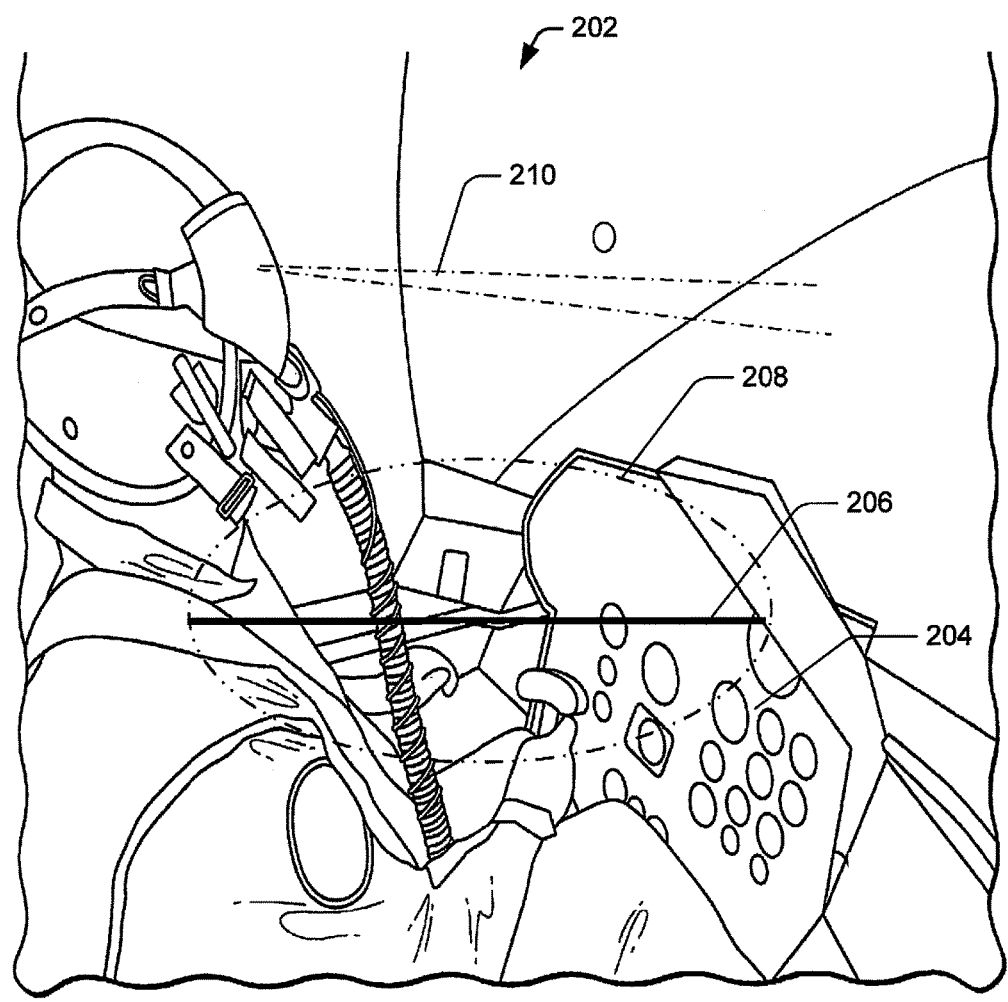
FIG. 2 shows a perspective view of a pilot seated in an example cockpit 202.

For instance, FIG. 2 shows a perspective view of a pilot seated in an example cockpit 202. Directly in front of the pilot are flight instruments 204 and other conventional control apparatus.

An example holographic image 206 of a virtual-horizontal plane is projected into a peripheral area 208—from the pilot's perspective—of cockpit 202. In this illustration, example holographic image 206 appears on the right side the pilot when facing forward, and specifically, a peripheral area 208 of cockpit.

It should be appreciated by those skilled in the art after having the benefit of this disclosure that peripheral area 208 of cockpit 202 is an area that is primarily visible in pilot's peripheral vision when seated and facing forward. Put differently, holographic image 206 may be projected to the right, left, above, or below the pilot's focal-vision line 210 when facing forward. It is also possible for portions of holographic image 206 to extend across the pilot's focal-vision line 210.

As depicted in FIG. 2, example holographic image 206 is a virtual-horizontal plane representative of the actual horizon. As will be explained, this example virtual-horizontal plane moves based on the speed, pitch, and/or bank data of the plane. That is, the virtual-horizontal plane moves in a corresponding manner to the actual horizon to mimic apparent movement of the actual horizon relative to the aircraft while the aircraft is maneuvered. So, example holographic image 206 (i.e., a virtual-horizon plane in this illustration) replicates the apparent movement of the actual horizon as the aircraft is maneuvered.

In another aspect, holographic image 206 is a virtual-horizon plane (i.e., a 180-degree plane) situated at all times at the actual-horizon line so that the virtual-horizon plane mimics the apparent movement of the actual horizon as the aircraft maneuvers. That is, the virtual-horizon plane will roll and pitch.

In one aspect, holographic image 206 is translucent so that a pilot can see through it to the instrument panel or outside the cockpit.

In another aspect, holographic image 206 is opaque.

In one aspect, holographic image 206 is illuminated in blue-green light. Nonetheless, the holographic image may be projected in any suitable color or multiple colors.

Figure 3:
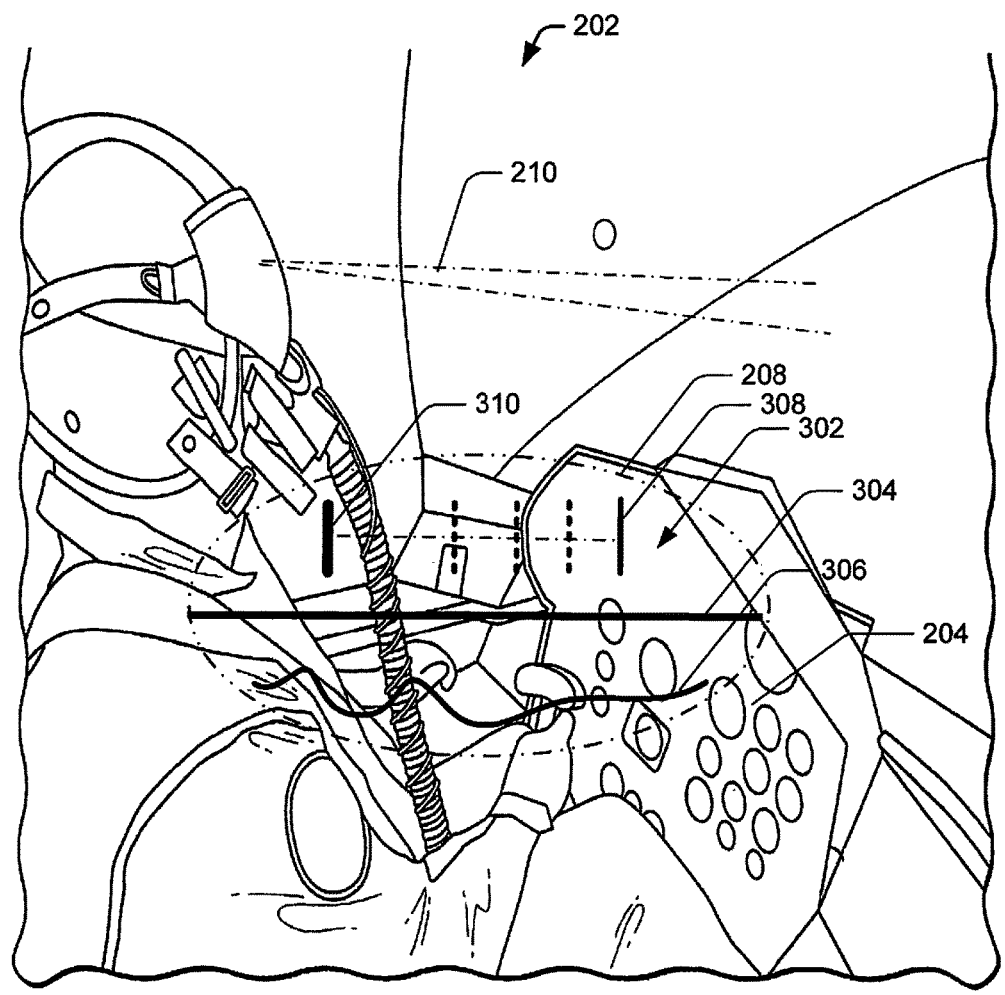
FIG. 3 shows another perspective view of a pilot seated in an example cockpit 202.

In one aspect, the holographic image may include other virtual-visual cues. For example, FIG. 3 shows another example view of a pilot sitting inside an example cockpit 202. In this illustration, example holographic image 302 may include multiple visual cues, such as a virtual-horizontal plane 304 (FIG. 3) (also shown as reference number 206 in FIG. 2 and described above with reference to FIG. 2), and a virtual-terrain icon 306, shown in FIG. 3.

Virtual-terrain icon 306 is another generally peripheral visual cue that may display virtual-terrain features and/or virtual-manmade structures which are representative of actual-terrain features and/or manmade structures below cockpit 202, as the aircraft approaches and passes over these actual terrain features/structures.

In one example, the lighting intensity and/or resolution of virtual features displayed by virtual-terrain icon 306 can increase (or become visible and illuminate) after the aircraft flies below a minimum-descent altitude (MDA).

In another example, the color of virtual-terrain icon 306 may activate and illuminate, change color (such as from black to red) and/or flash to alert the pilot that the aircraft has flown below the MDA.

Depending on the aircraft, the resolution and type of features displayed by virtual-terrain icon 306 can vary. For instance, for rotary aircraft, it may be beneficial to display more virtual features in virtual-terrain icon 306 that correspond to actual terrain features below the aircraft that would be actually be ideally visible to the pilot in ideal conditions. On the other hand, for fixed-wing aircraft it may not be necessary to display as many features or with as much resolution in virtual-terrain icon 306.

In another aspect, an example holographic image 302 may include additional visual cues. For example, visual icons 308, 310 may be used to judge closure between a virtual icon 310 representing the position of the aircraft, to a virtual icon 308 representing a target (such as another aircraft, an aircraft-carrier deck, a runway, or some other fixed or moving object relative to the plane), as the aircraft approaches the actual target. For instance, virtual icon 308 (target icon) is located and moved in positional relationship to virtual icon 310 (representing the position of the plane relative to the target) according to real distances, position, and speeds from the aircraft, so that the pilot may see closure in a continuous yet graduated manner. The position of virtual icon 310 with respect to virtual icon 308 may be horizontal, diagonal, vertical, and/or any combination of the aforementioned, such as to match the actual position and closure between the aircraft and the target.

In addition, the actual visual cues used to represent virtual icons 308, 310 may vary. For instance, virtual icon 310 may be textual and/or pictorial such as an airplane. Likewise, virtual icon 308 may be textual and/or pictorial, such as an airplane, runway, ship, or represent some other actual object. Virtual icon 308 may also appear in different colors, and/or flash at faster rates after the distance between the actual target and aircraft falls below a preset-minimum distance.

Thus, visual cues, such as virtual icons 308, 310 may be placed into holographic image 208 to correspond to real distances and speeds, so that a pilot may see closure in a continuous yet graduated manner. Because holographic image 208 and all the visual cues displayed therein appear in a pilot's peripheral vision, they are processed preconsciously to take advantage of the pilot's preconscious process. Thus, these visual cues are processed independently and more rapidly than the conscious brain.

3.0 Example Controller, and System

Figure 4:
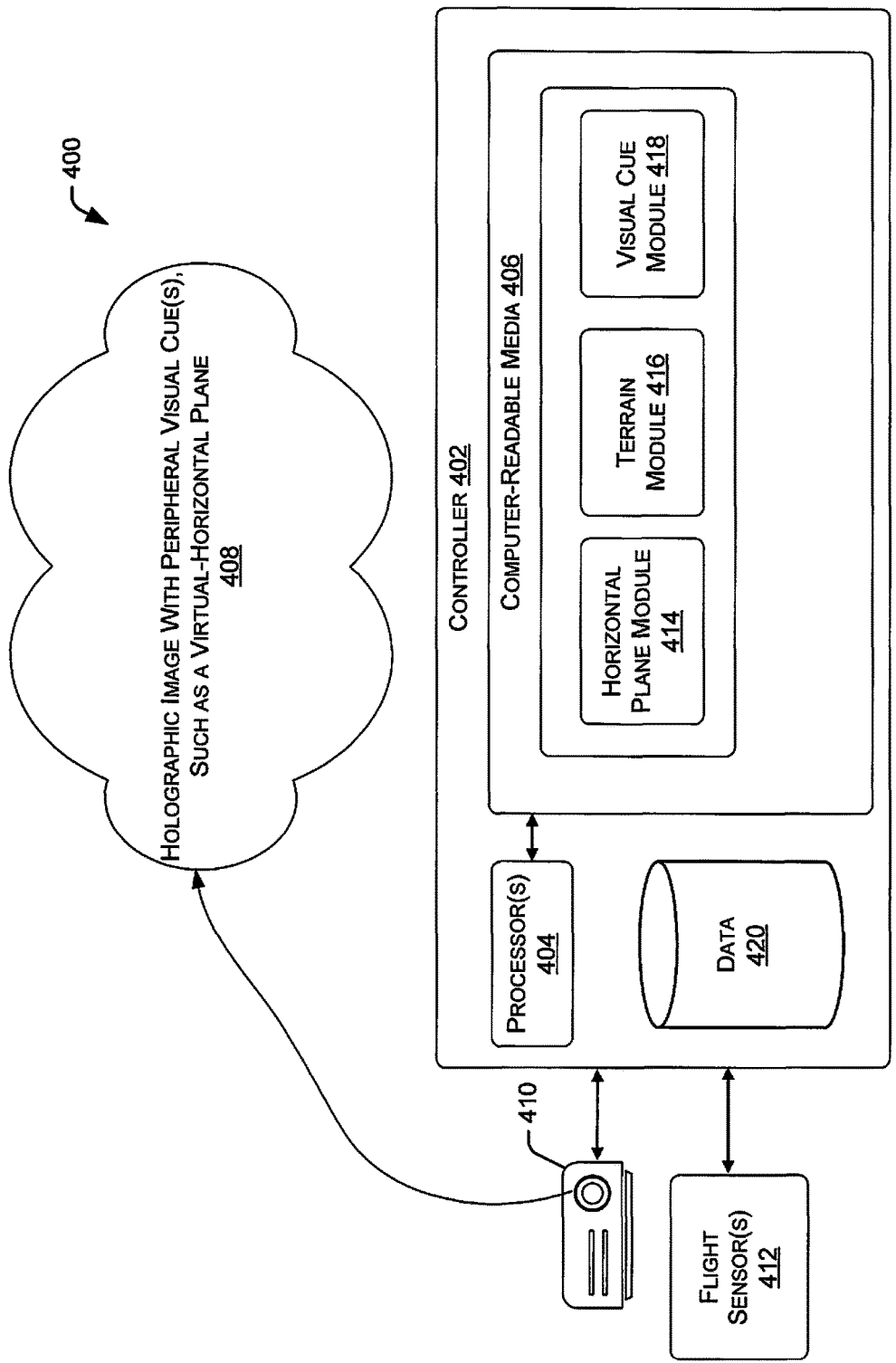
FIG. 4 is block diagram illustrating a system used to control and display holographic images in the cockpit of an aircraft.

FIG. 4 is block diagram illustrating a system 400 used to control and display holographic images in the cockpit of an aircraft, such as example images 202, 302 shown in FIGS. 2 and 3. Referring to FIG. 4, system 400 includes a controller 402, which may represent any suitable computing device(s) having one or more processor(s) 404, and the ability to process a computer-readable media 406. Processor(s) 404 interact with computer-readable media 406 to execute instructions that control movement elements appearing in holographic image(s) 408 projected (i.e., emitted) from one or more holographic projector(s) 410.

Projector(s) 410 may be positioned on the floor, wall, or ceiling (not shown) of the cockpit to project holographic image(s) 408.

Processor(s) 404 also interact with flight data received from one or more flight sensor(s) 412 so as to facilitate movement (and other features, such as color and frequency) of visual cues displayed in the holographic image that coincide with physical movements of the aircraft, so as to replicate the actual position of the plane with reference to actual physical elements external to the aircraft.

Sensor(s) 412 may include a Course Displacement Indicator (not shown), an altimeter (not shown), a heading indicator (not shown), radar (not shown), a camera (not shown), a collision-avoidance system (not shown), a ground-warning system (not shown), attitude Indicators (not shown); Global Positioning Systems (not shown), other air speed indicators (not shown), compass (not shown), and other avionic instruments traditionally used in fixed wing and rotor aircraft.

Processor(s) 404 may be distributed in more than one computer system and over a network (not shown). Controller 402 may be an off the shelf computer system, or a specially computer. Further, although not shown, any number of system busses, communication, and peripheral interfaces, input/output devices, and other devices may be included in (or connected to) controller 402, as is appreciated by those skilled in the art.

Computer-readable media 406 may include any suitable computer-storage media including volatile and non-volatile memory, and any combination thereof. For example, computer storage media includes volatile and non-volatile, removable and non-removable media implemented in any method or technology for storage of information such as computer readable instructions, data structures, program modules, or other data. Computer storage media may further include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory or non-transmission medium that can be used to store information for access by system 400.

In other examples, the computer-readable media 406 may include communication media that may embody computer readable instructions, data structures, program modules, or other non-transitory computer-readable media having stored code for performing one or more peripheral-visual-cuing tasks as described in this application.

Further, computer-readable media 406 may be local and/or offsite to controller 402. For instance, one or more portions of, or all of data or code stored in computer readable media 406, may be accessed from a computer-storage medium local to and/or remote to controller 402, such as from a storage medium connected to a network.

Controller 402 is configured with a horizontal-plane module 414 maintained in computer-readable media 406. In one example, horizontal-plane module 414 (and modules 416 and 418 to be described) may be implemented as code in the form of computer-readable instructions that execute on one or more processors 404. For purposes of illustration, programs and other executable-program modules are illustrated herein as discrete blocks, although it is recognized that such programs and components may reside at various times in different storage components. Further, such code may be implemented as one or more applications or modules, or may be integrated as components within a single application. Such code stored in computer-readable media 406 may be implemented across one or more devices in a cloud computing environment, on a local device, or on a combination of both.

Example horizontal-plane module 414 facilitates a mode of operation of system 400 in which sensor speed, pitch, and/or bank information is received and processed, and a virtual-horizontal plane is projected in the holographic image 408 (FIG. 4) based on the received information. For example, horizontal-plane module 414 instructs processor(s) 404 to use the aircraft's speed, pitch, and horizon data received from sensor(s) 412, and instructs projector 410 to display a moving holographic image 206, 304 (i.e., a virtual-horizon plane in the illustration of FIG. 2, and reference number 304 in FIG. 3) that replicates or mimics the apparent movement of the actual horizon as the aircraft is maneuvered based on these sensed parameters or other suitable parameters.

Horizontal-plane module 414 may also perform other processes and instruct projector(s) 410 to generate additional visual cues in association with the artificial horizon displayed in the holographic image, such as described above with reference to FIG. 3.

Example terrain module 416 facilitates a mode of operation of system 400 in which processor(s) 404 are instructed to process sensed speed, altitude, pitch, bank information, and/or terrain information, and based on this information, instructs projector 410 to display a virtual-terrain icon 306 (FIG. 3) in a holographic image 306, 408 (FIG. 4) as described with reference to FIG. 3. Terrain module 416 may also perform other processes and instruct projector(s) 410 to generate additional visual cues in association with virtual terrain displayed in the holographic image, such as described above with reference to FIG. 3.

Example visual-cue module 418 facilitates a mode of operation of system 400 in which processor(s) 404 are instructed to process sensed speed, altitude, pitch, bank information, terrain information, and/or other parameters, and based on this information, instructs projector 410 to display virtual-visual cues (i.e., virtual icons 308, 310) (FIG. 3) in a holographic image 306, 408 (FIG. 4) as described with reference to FIG. 3. For example, these virtual-visual cues may represent an actual target a distance away from the aircraft. Visual-cue module 418 in conjunction with processor(s) 404 instructs projector(s) 410 to move the visual cues in the holographic image in relation to actual speed and distance of the aircraft from the actual target. The movement of the virtual icon in the holographic image allows a pilot to perceive closure of the aircraft relative to the target in a continuous and graduated manner. Visual-cue module 418 may also perform other processes and instruct projector(s) 410 to generate additional visual cues in association with other visual cues displayed in the holographic image, such as described above with reference to FIG. 3.

At any time any of the modules or processor(s) 404 may store or retrieve data in a storage medium 420 or other repository including remote or local storage.

4.0 Example Process

Figure 5:
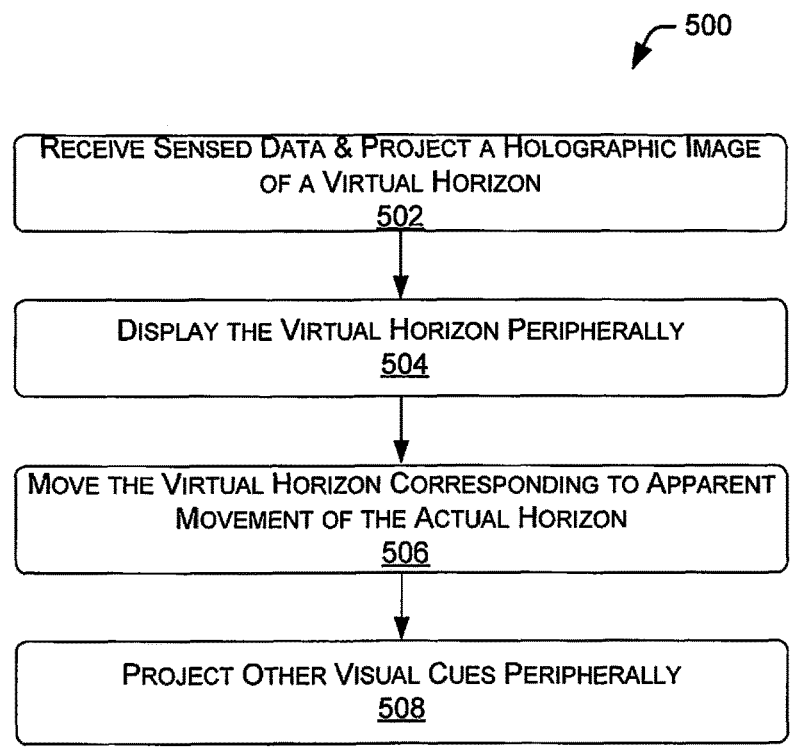
FIG. 5 shows an illustrative process for controlling a peripheral visual cuing system according various embodiments.

FIG. 5 shows an illustrative process 500 for controlling a peripheral visual cuing system according various embodiments. Process 500 may be described with reference to FIGS. 1 through 4.

Process 500 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions. The order in which the operations are described is not intended to be construed as a limitation, and any number of the described blocks can be combined in any order and/or in parallel to implement the process. Also, one or more of the described blocks may be omitted without departing from the scope of the present disclosure.

At 502, a holographic image is displayed in the cockpit based on sensed parameters, such as speed, pitch, attitude of the aircraft, and other suitable parameters. The holographic image includes visual cues. In one example, the holographic image includes a virtual horizon, such as described and depicted in FIGS. 2 and 3.

At 504, at least a portion of the holographic image is displayed in a peripheral area of the cockpit from the perspective of the pilot.

At 506, the virtual horizon is moved in a manner that replicates apparent movement of the actual horizon as the aircraft is maneuvered based on sensed-positional information of the aircraft.

At 508, other visual cues may be projected peripherally as described above with reference to FIGS. 2, 3, and 4.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. In an otherwise conventional cockpit of an aircraft, a method for improving a pilot's situational awareness and spatial orientation, the method comprising:
   obtaining, speed of the aircraft relative to the ground, speed of the aircraft's descent, pitch, and bank information from one or more sensors associated with the aircraft;
   projecting a holographic image of a virtual horizon representative of the actual horizon into a peripheral area of the cockpit, so that the holographic image appears only in a pilot's left or right peripheral vision, and not in the front of the pilot, when the pilot is seated, and facing forward in the cockpit so as to utilize the pilot's preconscious processing in lieu of conscious brain serial processing that is triggered by focal vision; and
   moving the virtual horizon of the holographic image, based on the speed relative to the ground, speed of descent, pitch, and bank information, so that the virtual horizon moves and changes shape in a corresponding manner with the actual horizon to mimic apparent movement and shape change of the actual horizon relative to the aircraft while the aircraft is maneuvered.

2. The method of claim 1, further comprising:
   projecting a visual cue in the holographic image; and
   moving, the visual cue in the holographic image, in synchrony with the received speed, pitch, and bank information.

3. The method of claim 1, further comprising projecting a virtual representation of terrain below the aircraft in the same holographic image or a second holographic image, which is positioned in a pilot's peripheral vision to the left, right, above or below the pilot.

4. The method of claim 1, further comprising:
   projecting a virtual icon in the holographic image, wherein the virtual icon represents an actual target a distance away from the aircraft; and
   moving, the virtual icon in the holographic image in relation to actual speed and distance of the aircraft from the actual target, whereby the movement of the virtual icon in the holographic image allows a pilot to perceive closure of the aircraft relative to the target in a continuous and graduated manner.

5. The method of claim 1, wherein the holographic image is translucent.

6. A system for improving a pilot's situational awareness and spatial orientation in an otherwise conventional aircraft cockpit, the system comprising:

one or more sensors configured to detect aircraft speed relative to the ground, speed of descent, pitch, and bank information one or more holographic projectors;

a controller, coupled to the one or more holographic projectors and the one or more sensors, configured to receive the aircraft speed relative to the ground, speed of descent, pitch, and bank information from the one or more sensors, and instruct the one or more holographic projectors to:

(a) project a holographic image of a virtual horizon into a peripheral area of the cockpit, so that the holographic image appears only in a pilot's left or right peripheral vision to utilize the pilot's preconscious processing in lieu of conscious brain serial processing that is triggered by focal vision, when the pilot is seated, and facing forward in the cockpit; and (b) move the virtual horizon of the holographic image, based on the speed relative to the ground, speed of descent, pitch, and bank information, so that the virtual horizon moves and changes shape in a corresponding manner to the actual horizon to mimic apparent movement and shape change of the actual horizon relative to the aircraft while the aircraft is maneuvered.

7. The system of claim 6, wherein the controller is further configured to instruct the one or more holographic projectors to project a visual cue in the holographic image; and move the visual cue in the holographic image, in synchrony with the received speed, pitch, and bank information.

8. The system of claim 6, wherein the controller is further configured to instruct the one or more holographic projectors to project a virtual-visual cue in the holographic image, wherein the virtual-visual cue represents an actual target a distance away from the aircraft; and move, the virtual-visual cue in the holographic image in relation to actual speed and distance of the aircraft from the actual target, whereby the movement of the virtual-visual cue on in the holographic image allows a pilot to perceive closure of the aircraft relative to the target in a continuous and graduated manner.

9. The system of claim 7, wherein the one or more holographic projectors are configured to illuminate a translucent holographic image.

10. A non-transitory-computer readable medium having stored thereon a computer program for improving a pilot's situational awareness and spatial orientation in an aircraft cockpit, the computer program comprising instructions that when executed by a processor, cause the processor to perform operations including:

obtaining, at the processor, speed relative to the ground, speed of descent, pitch, and bank information from one or more sensors associated with the aircraft;

generating, using the processor, a holographic image of a virtual horizon, based on the speed relative to the ground, speed of descent, pitch, and bank information; and projecting the holographic image of the virtual horizon into a peripheral area of the cockpit, so that the holographic image appears only in the pilot's left or right peripheral vision, and not in the front of the pilot, when the pilot is seated and facing forward in an otherwise conventional cockpit so as to utilize the pilot's preconscious processing in lieu of conscious brain serial processing that is triggered by focal vision; and moving the virtual horizon of the holographic image based on the speed relative to the ground, speed of descent, pitch, and bank information, so that the virtual horizon moves and changes shape in a corresponding manner to the actual horizon to mimic apparent movement and shape change of the actual horizon relative to the aircraft while the aircraft is maneuvered.

\* \* \* \* \*